UNITED STATES PATENT OFFICE.

JOSHUA MERRILL, OF BOSTON, MASSACHUSETTS.

IMPROVEMENT IN THE MANUFACTURE OF HYDROCARBON OILS.

Specification forming part of Letters Patent No. 32,705, dated July 2, 1861.

*To all whom it may concern:*

Be it known that I, JOSHUA MERRILL, of the city of Boston, county of Suffolk, and State of Massachusetts, have invented a certain new and useful Improvement in the Manufacture of Hydrocarbon Oils; and I do hereby declare that the following is a full and correct description thereof.

In the practical manufacture of hydrocarbon oils it is customary to treat the oil after each successive distillation with sulphuric acid until such matters as can be removed by the acid are entirely separated from the oil. The acid so used has heretofore been thrown away as of little value; or the residues have been washed out with water and afterward again concentrated for use, which in practice has not proved economical.

My said invention consists in the employment of some of the acid residues without alteration for the purpose of purifying, or aiding in purifying, the oils in a different stage of the process of manufacture, as follows:

I do not use the acid sludge from the crude-oil purification, because it is united with so great a quantity of impurities as to nearly, if not entirely, utilize its purifying power; but the acid sludges from the succeeding treatments I use in purifying, or to aid in purifying, the oil in the next preceeding stage of the manufacture; or I use the acid sludge from all the subsequent treatments to purify the crude oil. The crude oil will usually require all the acid residues from the subsequent treatments for its purification and occasionally the addition of some fresh acid.

The saving by this process in the manufacture of illuminating-oils from crude coal-oils, petroleums, and similar substances is at least twenty-five per cent. of the former cost of acid for the purification, which is a very important item in a large oil-factory.

What I claim as my invention and improvement in the manufacture of hydrocarbon oils is—

The above-described improvement in the process of purifying hydrocarbon oils by treating the first distillate with acid residues, substantially as described.

JOSHUA MERRILL.

Witnesses:
GEORGE H. CONRY,
L. H. PEASLEE.